(12) United States Patent
Shane

(10) Patent No.: US 6,875,342 B2
(45) Date of Patent: Apr. 5, 2005

(54) FILTER CARTRIDGE WITH STRUCTURALLY AND ADHESIVELY ATTACHED OUTER SLEEVE AND METHOD OF ASSEMBLY

(75) Inventor: Bruce E. Shane, Delta, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 32 days.

(21) Appl. No.: 10/265,878

(22) Filed: Oct. 4, 2002

(65) Prior Publication Data

US 2003/0085165 A1 May 8, 2003

Related U.S. Application Data

(60) Provisional application No. 60/332,853, filed on Nov. 6, 2001.

(51) Int. Cl.[7] ............................................. B01D 27/06
(52) U.S. Cl. ..................... 210/85; 210/457; 210/484; 210/487; 210/490; 210/493.1; 210/493.2; 156/69; 156/163; 156/294; 156/275.7
(58) Field of Search ......................... 210/85, 484, 490, 210/493.1, 493.2, 493.5, 497.01, 497.2, 315, 485, 487–489, 493.3, 499; 55/521; 156/163, 294, 275.7, 69

(56) References Cited

U.S. PATENT DOCUMENTS

| | | |
|---|---|---|
| 2,801,009 A | 6/1957 | Bowers |
| 3,165,473 A | 1/1965 | Pall et al. |
| 3,189,179 A | 6/1965 | McMichael |
| 3,241,680 A | 3/1966 | Humbert, Jr. |
| 3,306,794 A | 2/1967 | Humbert, Jr. |
| 3,334,752 A | 8/1967 | Matravers |
| 3,376,979 A * | 4/1968 | Bair ........................... 210/457 |
| 3,421,630 A | 1/1969 | Acosta |
| 3,442,392 A | 5/1969 | Skelley |
| 3,692,184 A | 9/1972 | Miller, Jr. et al. |
| 3,716,970 A | 2/1973 | Stupf et al. |
| 4,046,697 A | 9/1977 | Briggs et al. |
| 4,102,792 A | 7/1978 | Harris |
| 4,120,711 A | 10/1978 | Gudeman |
| 4,154,688 A | 5/1979 | Pall |
| 4,402,830 A | 9/1983 | Pall |
| 4,404,830 A | 9/1983 | Koch |
| 4,609,465 A | 9/1986 | Miller |
| 4,660,779 A | 4/1987 | Nemesi et al. |
| 4,693,985 A | 9/1987 | Degen et al. |
| 4,836,931 A | 6/1989 | Spearman et al. |
| 4,882,056 A | 11/1989 | Degen et al. |
| 4,902,427 A | 2/1990 | Szczepanik |

(Continued)

FOREIGN PATENT DOCUMENTS

| | | | |
|---|---|---|---|
| DE | 197 37 954 A1 | 3/1999 | |
| EP | 0 213 930 | 3/1987 | |
| EP | 724472 B1 * | 9/1997 | ........... B01D/27/00 |
| GB | 723200 | 2/1955 | |
| GB | 2152471 A | 8/1985 | |
| GB | 2192810 A | 1/1988 | |
| GB | 2214448 A | 9/1989 | |

OTHER PUBLICATIONS

Copy of Notification of Transmittal of the International Search Report or the Declaration in corresponding PCT Application No. PCT/US31081.

Primary Examiner—Matthew O. Savage
(74) Attorney, Agent, or Firm—Christopher H. Hunter

(57) ABSTRACT

A fluid filter includes a cylindrical pleated filter media disposed around a central perforated support core or self-supporting. An outer support sleeve comprising a extruded nylon, diamond-shaped mesh is stretched across the pleated media, and elastically conforms to the pleat peaks to structurally retain the pleats of the pleat peaks in fixed relation to one another. A bead of adhesive is then applied over the sleeve to fix the sleeve to the pleat peaks. End caps are disposed at opposite ends of the fluid filter.

10 Claims, 5 Drawing Sheets

U.S. PATENT DOCUMENTS

| | | |
|---|---|---|
| 4,956,089 A | 9/1990 | Hurst |
| 5,039,413 A | 8/1991 | Harwood et al. |
| 5,211,846 A | 5/1993 | Kott et al. |
| 5,252,207 A * | 10/1993 | Miller et al. ................ 210/335 |
| 5,456,834 A | 10/1995 | Bowlsbey |
| 5,476,585 A | 12/1995 | Mills |
| 5,543,047 A * | 8/1996 | Stoyell et al. ............ 210/493.2 |
| 5,605,625 A | 2/1997 | Mills |
| 5,814,219 A | 9/1998 | Friedmann et al. |
| 5,824,232 A | 10/1998 | Asher et al. |
| 6,143,106 A | 11/2000 | Shane |

\* cited by examiner

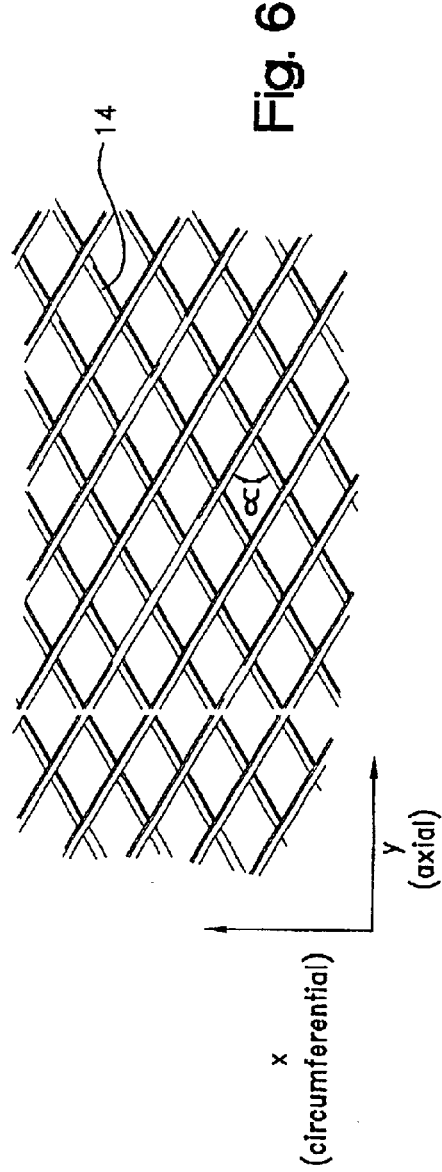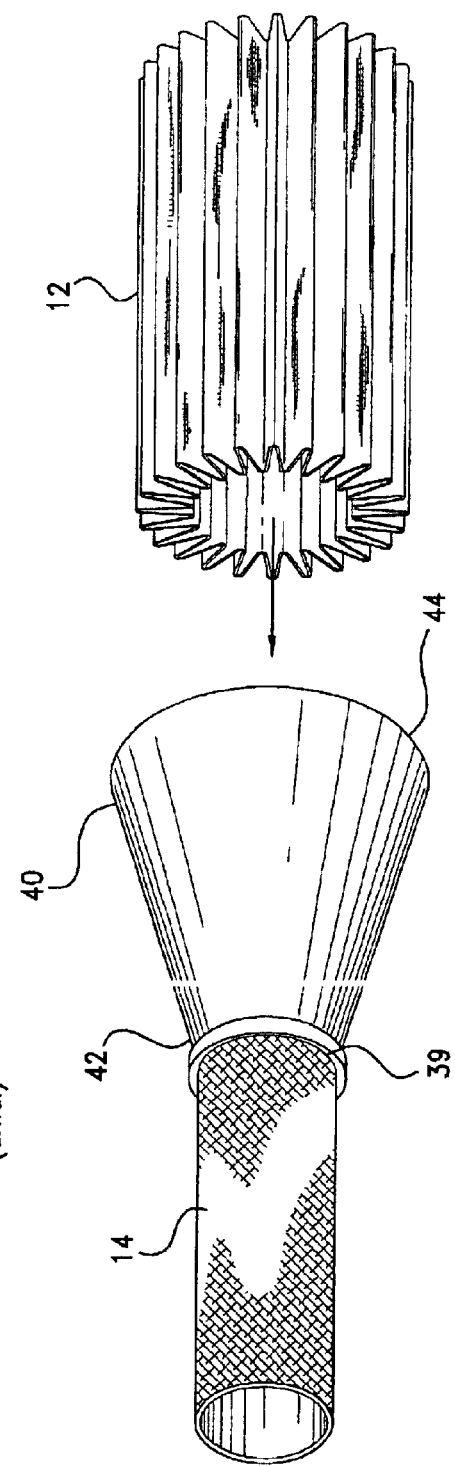
Fig. 6
Fig. 3

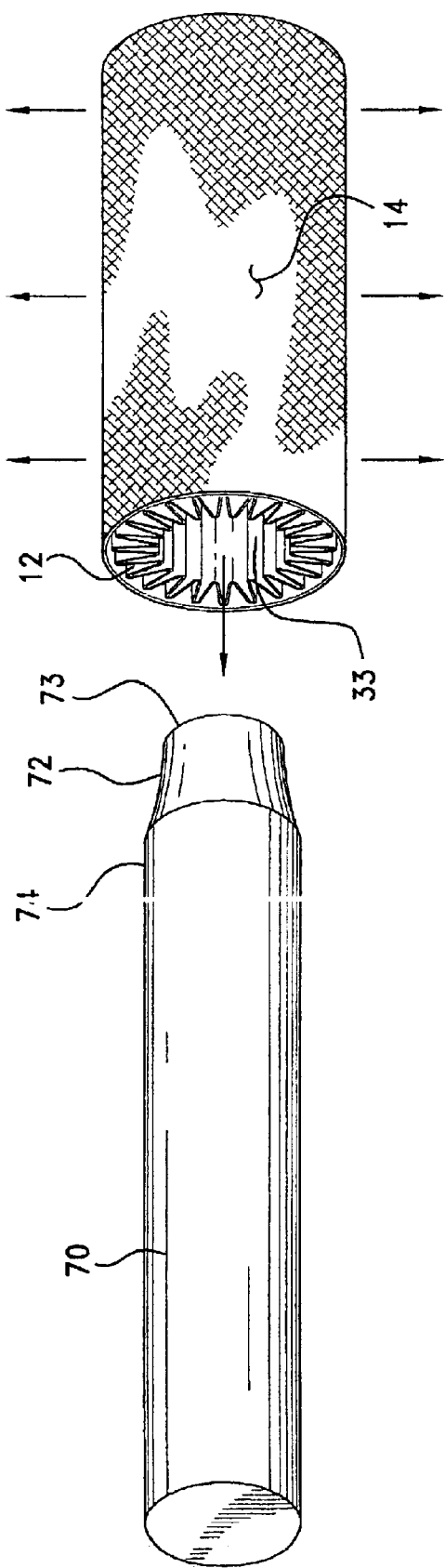

FILTER CARTRIDGE WITH STRUCTURALLY AND ADHESIVELY ATTACHED OUTER SLEEVE AND METHOD OF ASSEMBLY

CROSS-REFERENCE TO RELATED CASES

The present application claims the benefit of the filing date of U.S. Provisional Application Ser. No. 60/332,853; filed Nov. 6, 2001, the disclosure of which is expressly incorporated herein by reference

FIELD OF THE INVENTION

The present invention relates generally to fluid filters and their assembly.

BACKGROUND OF THE INVENTION

One known type of filter element for filtering fluid such as hydraulic or lube oil comprises a sheet of filter material folded to form a plurality of parallel pleats or folds. The side edges of the sheet are brought together so that the sheet has a cylindrical configuration, with the pleats of the sheet extending in the axial or longitudinal direction. The side edges of the sheet are then joined together such as with adhesive, stitching or other means, to retain the filter material in the cylindrical form.

Such a pleated media has certain advantages over non-pleated media, as the pleats provide a large surface area in contact with the fluid to be filtered, which increases the dirt holding capacity and minimizes the pressure loss of the filter element.

The pleated filter media can be coreless, i.e., self-supporting, and received over a cylindrical perforated support tube integral with the filter housing when the element is located in the housing; or can include a cylindrical perforated core integral with the element. End caps are typically received on either end of the filter element with appropriate adhesive being applied between the end caps and the media. One of the end caps has a central opening such that fluid passing radially through the filter media is allowed to flow through the opening to an outlet passage in the housing. Fluid to be filtered typically passes radially inward through the filter media and then outward through the opening in the end cap, as this is the most advantageous flow direction for the efficient filtering of fluid.

It is important that the pleats of the filter media be able to withstand the pressure drop of fluid flowing through the media. If a significant pressure drop occurs, the pleats can become deformed, and fold-over or bunch against one another. This is not desirable, as the surface area of the pleats available for filtration is reduced, which reduces the useful life of the element. One solution is to impart the filter media with resin, which is then cured to give the filter media a certain amount of rigidity. However, solely a resin-cured media cannot withstand the pressure drops occurring across the media in many applications. The resin curing also adds manufacturing steps, which increases the overall cost of the element. Alternatively (or in addition to the resin curing), a thin, epoxy-covered steel mesh can be layered with the media when the media is pleated. However, this also increases the manufacturing steps for fabricating the filter element, and increases the cost of the element. Steel mesh also does not lend itself to easy disposal in landfills, that is, it is not easily incineratable, which raises environmental issues.

A number of techniques have been proposed to directly support the pleats of the filter media. Humbert, Jr., U.S. Pat. No. 3,306,794, for example, shows a pleated filter media surrounding a central core, where globules or droplets of adhesive cement are applied to the pleat peaks, and an outer perforated paper layer is then wrapped around the pleats. The side edges of the paper layer are overlapped and adhesively attached together. It is also known to apply hot melt adhesive to the pleat peaks, and then wrap a spiral support layer around the pleats. It is also believed that fusion bonding has been used to attach an outer support wrap to an inner filter media.

Another technique is shown in Hurst, U.S. Pat. No. 4,956,089 where pleated media is located between inner and outer support cages. Each of the support cages consists of a gridded tube of thermoplastic material such as polypropylene. Degen, U.S. Pat. No. 4,693,985; Asher et al., U.S. Pat. No. 5,824,232; and Miller, U.S. Pat. No. 4,609,465, show similar structures, where an outer support weave, mesh or cage is formed from material such as fluoropolymers, halogenated polymers, polyesters, or polyolefins such as polypropylene and polyethylene. Applicants believe that monofilament fabric of high density polymer is typically used for the support cages. As should be appreciated, such materials provide relatively rigid support cages.

It is believed that prior art support structures for pleated medias have either been relatively rigid, cage-like structures which are intended to provide support for a pleated media between the cages; or have been formed of a more flexible material which is mechanically or chemically attached to the pleats of the media, such as with a previously-applied bead or droplets of adhesive. While these techniques might provide sufficient structural integrity for pleated media in many applications, it is believed that these techniques can have certain drawbacks. Providing rigid inner and outer cages, for example, requires relatively expensive polymers or other materials, and expensive manufacturing steps to form the cages. The manufacturing tolerances of the cages also have to be carefully controlled so as to fit closely over the pleats. Further, while the cages purport to provide structural integrity for the element, it is believed that such structural integrity is mainly in the axial direction, i.e., to prevent crushing of the element. The pleats are still generally free to move within the cages. This can still raise issues of fold-over and bunching of the pleats during use.

On the other hand, for adhesively-attached wraps, the adhesive can smear across the pleat peaks and against the inside surface of the media as the wrap is being applied. This is unsightly and can clog the pores in the media, thereby reducing the available surface area of the media. There can also be issues of compatibility of the fluid to be filtered and the adhesive, particularly with hot-melt adhesives, as it has been found that some adhesive bonds in certain commercially-available cartridges break during use. It can also be difficult to apply an inked label over the outer sleeve of an adhesively-attached wrap, as the adhesive globules distort the information as it is applied. This has generally required the sleeve be pre-printed with the manufacturer's name, etc. This does not lend itself to easy modification of the information, or tailoring the information to a particular element. All-in-all, the above can be unacceptable, or at least undesirable, in many applications.

As such, Applicant believes there is a demand in the industry for a pleated filter element with an outer support structure which is easily located over the pleats, and which prevents the pleats from moving relative to each other during use, but which does not require difficult or expensive mechanical or chemical steps to bond the support structure to the pleats.

SUMMARY OF THE PRESENT INVENTION

The present invention provides a novel and unique fluid filter, and a method for assembling the fluid filter, whereby the pleats of a cylindrical filter media are retained in fixed relation to one another by an elastic, continuous outer support sleeve. The sleeve retains the pleats by radial compression and by a bead of adhesive, which is applied after the sleeve is stretched around the pleats. The fluid filter is relatively easy and straight-forward to assemble, which reduces the overall cost of the filter element. The components of the filter also lend themselves to easy disposal in a landfill, as they are easily incineratable. As a still further benefit, the filter has a substantially unobstructed outer surface which allows the printing of identification indicia (model numbers, logos, etc.) directly on the filter using conventional printing machines and devices.

According to the preferred embodiment of the present invention, the outer support sleeve has a continuous, tubular form which is stretched over the pleats and conforms generally to the peaks of the pleats. The support sleeve is formed from an elastic material, and preferably from a polymer mesh such as an extruded nylon, diamond-shaped mesh. The mesh has a high stand density and a strand angle of between about 60 and 90 degrees in the circumferential direction, which provides good expansion characteristics in the circumferential direction. The support sleeve normally has a slightly smaller outer dimension than the cylindrical pleated media, and is expanded at least 3% when stretched over the cylindrical pleated media.

Preferably, the pleated media comprises a multi-layered sheet, with wet-laid fiberglass filtration layer(s) having non-woven support interposed between an outer, extruded polymer support mesh, and an inner, extruded polymer support mesh. The support sleeve and outer support mesh of the pleated media inter-engage because of their similar mesh structure to provide further structural support for the element.

After the sleeve is located over the media, a bead of clear adhesive is applied around the sleeve. The adhesive is preferably a UV-cured adhesive, and is otherwise chosen such that the adhesive easily wicks through the sleeve to provide a firm attachment of the sleeve to the pleat peaks of the media. The high strand density of the sleeve and the absorption of the adhesive into the element allow identification indicia to be printed directly on the outer surface of the filter element. This can be accomplished using conventional ink-pad, ink-jet or laser printing machines or devices. End caps can be fixed (bonded) to the ends of the cartridge, either before or after the adhesive bead is applied.

The fluid filter is assembled by initially providing the filter media sheet with a continuous series of axially-extending, interconnected pleats, with the side edges of the sheet joined then together such as with adhesive to retain the filter media in a cylindrical form.

The tubular support sleeve is then temporarily connected at one end to a conical assembly tool, and the cylindrical pleated media is forced through the conical tool to radially compress the media such that the media can be easily slid into the support sleeve.

The composite structure (pleated media and support sleeve) is then radially enlarged. If the fluid filter is to have an inner support core, a second conical assembly tool is temporarily attached to an end of the support core, and the support core is then forced into the central cavity of the cylindrical media, expanding the cylindrical media into the support sleeve. The support sleeve elastically conforms to the pleat peaks and locks the pleats in fixed relation to one another. The conical tool is then removed from the forward end of the support core.

For a coreless element, a mandrel with a similar conical assembly tool is forced into the central cavity of the composite structure, radially enlarging the media, with the support sleeve again elastically conforming to the pleat peaks. The mandrel is then removed, which allows the cylindrical pleated media to contract slightly, however, the outer support sleeve still elastically conforms to the pleat peaks to retain the pleats in fixed relation to one another.

The adhesive is then applied in a spiral form around the outer sleeve. The adhesive wicks through the sleeve and is then UV-cured, such that the adhesive permanently bonds the pleats to the outer sleeve. Once the outer sleeve is pulled over the pleated cartridge, the pleats require no further locating or fixturing prior to bonding the pleat peaks to the sleeve.

The end caps are then bonded to opposite ends of the media, which also bonds the support sleeve (and support core, if present) to the media along the ends of the media. Appropriate indicia can then be applied (e.g., printed) directly on the outer surface of the filter.

The fluid filter is novel and unique in that it has a pleated structure and an outer flexible support sleeve which retains the pleats in fixed relation to one another without difficult or expensive mechanical or chemical bonding. The technique for assembling the fluid filter is relatively easy and straight-forward, which reduces the overall cost of the element. The components of the filter element also lend themselves to easy disposal in a landfill, as they are easily incineratable. Further, the element can be easily marked with identification indicia to facilitate the easy identification of an appropriate filter element for a particular application.

Further features and advantages of the present invention will become apparent to those skilled in the art upon reviewing the following specification and attached drawings.

BRIEF DESCRIPTION OF THE DRAWINGS

FIG. 3 is a first step in the assembly of the filter element of FIG. 1;

FIG. 5 is a second step in the assembly of the filter element of a second embodiment;

FIG. 6 is an enlarged view of the strand matrix for the support sleeve of the filter element.

DETAILED DESCRIPTION OF THE PREFERRED EMBODIMENT

Figure 1:
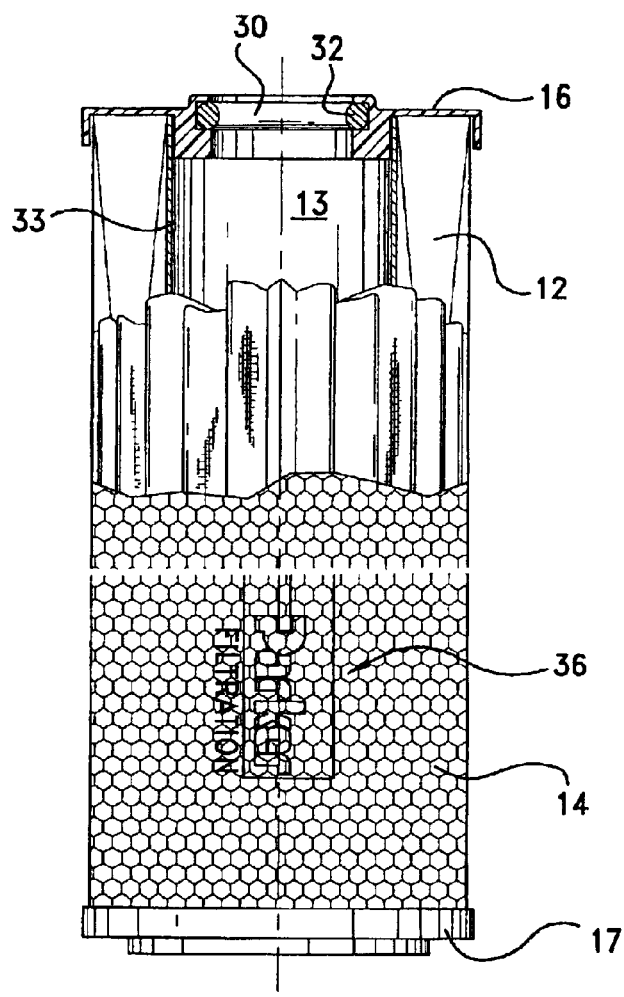
FIG. 1 is a side view of a filter element constructed according to the principles of the present invention, with portions of the element shown in cross-section.

Referring to the drawings, and initially to FIG. 1, a filter element constructed according to the principles of the present invention is indicated generally at 10. The filter element 10 includes a cylindrical pleated filter media 12 circumscribing a central cavity 13; an outer support sleeve 14 that will be described herein in more detail; and a pair of end caps 16, 17 disposed at opposite ends of the element. The end caps 16, 17 allow the filter element to be fluidly connected to appropriate passage(s) in a filter housing (not shown) and to allow fluid to flow out of (or into) the central cavity 13 of the element.

Figure 2:
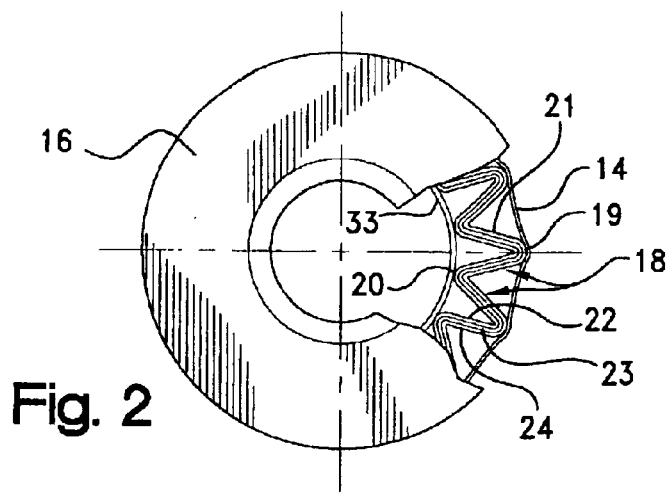
FIG. 2 is a partial cross-sectional end view of the filter element of FIG. 1.

As can be seen in FIGS. 1 and 2, the filter media 12 includes axially-extending pleats, for example as indicated generally at 18, which are continuously interconnected with one another. The pleats include outer ends 19 defining pleat peaks, inner (bight) ends 20, and sidewalls 21 interconnecting the outer ends and inner ends. The axes of the pleats are generally parallel to one another and can be formed using any appropriate pleat forming technique, such as a pleat forming machine or by hand. The number and dimension of the pleats can vary depending upon the particular application.

The filter media 12 preferably comprises a sheet having a multi-layered structure. The multi-layered structure includes an inner support mesh 22, an intermediate filtration layer 23, and an outer support mesh 24. The layers of the media can be formed from any appropriate material, for example polymer, cellulose, polypropylene, polyethylene, polyester, fiberglass, spun-bonded material, cloth, paper, nylon, Orlon, etc., or combinations thereof The inner and outer support meshes of the media are preferably an extruded polymer, while the intermediate filtration layer is preferably a wet-laid fiberglass media (e.g., borosilicate microglass fibers with acrylic binder). The support mesh should be as smooth as possible to prevent abrasion to the intermediate filtration layer. Upstream and downstream non-woven support layers (e.g., polyester, nylon or hemp layers) can also be provided on opposite sides of the filtration layer to prevent damage to the filtration layer. The choice of materials for the filtration layer and support mesh (and non-woven support layers—if provided) will generally depend upon the particular application, the compatibility with the fluid to be filtered, and temperature requirements. The techniques for forming each of the layers should be well-known to those skilled in the art.

The filtration layer 23 preferably has a rated pore size less than the rated "pore size" (strand density) of the support meshes 22, 24. Likewise, the thickness of the filtration layer 23 is preferably less than the thickness of the support meshes 22, 24. It is preferred that the filtration layer have a rated pore size of between 1 micron and 50 microns, and a thickness in the range of about 0.005 inch to about 0.025 inch. The support meshes each preferably have a strand density of about 16 strands per inch, and a thickness in the range of about 0.015 inch to about 0.025 inch. As should be appreciated, the efficiency of the filtration layer is of a magnitude many times greater than the efficiency of the filtration layers. The pore size, strand density and thickness of the filtration layer 23 and support meshes 22, 24 (and any non-woven support layer) can also obviously vary depending upon the particular application (even outside the above ranges). While a multiple-layered structure as discussed above is preferred, the filter media can also be a single layer depending upon the particular application. More than one filtration layer with one or more support mesh layers could also be provided, or only one or more filtration layer(s) without any supporting mesh layers could be provided.

In any case, the media sheet is preferably initially formed with the layers in overlying relation to each other, and the layers are pleated together using the conventional techniques described above. The side edges of the pleats are then brought together, and the edges are bonded, such as with an adhesive or by any other appropriate means, such that the media has a cylindrical configuration. The pleats extend continuously around the completed media subassembly, with the pleats projecting radially outward.

The outer support sleeve 14 for the element is formed from an elastic material, that is, a flexible material that can deform and recover at least a portion of its original shape. The support sleeve should also be formed of a material that is compatible with the fluid to be filtered, and has sufficient strength to withstand differential pressure across the filter media. Preferably the support sleeve is formed from a thermoplastic synthetic resinous polymer, for example, nylon, which can be extruded or woven, and has a diamond-shaped mesh or matrix structure (see FIG. 6). The rated pore size of the support sleeve should be less than the rated pore size of the underlying filtration layer, so that the support sleeve does not provide primary filtration. On the other hand, it is preferred that the sleeve have a high enough strand density to allow the printing of identification indicia (logos, model numbers, etc.) as at 36 directly on the outer surface of the sleeve, using conventional pad, ink-jet or laser printing machines or devices. A sleeve with a strand density of about 26 strands per inch, and a thickness in the range of about 0.010 inch and 0.030 inch has been found appropriate, however, again, the material, strand density and thickness of the sleeve may vary depending upon the particular application. The material for the support sleeve, strand density and thickness appropriate for a particular application, can be easily determined by those skilled in the art using simple experimentation.

As can be seen in FIG. 2, the outer support sleeve 14 is stretched over the pleats, and has an elasticity which allows the support layer to conform to at least the outer pleat peaks of the media. As should be appreciated, the sleeve is spaced from the pleats in the areas between the pleats. The outer support sleeve normally has a radial dimension which is slightly less than the normal outer radial dimension of the pleated media, and when the outer support sleeve is stretched over the media, the sleeve expands outwardly slightly beyond its normal dimension. Preferably, the sleeve is stretched at least 3%, and preferably between about 3–6% beyond its normal outer dimension, that is, the diameter of the sleeve increases at least 3% when stretched. The stretched elastic support sleeve provides radial compression on the pleats to hold the pleats in fixed relation to one another. It has been determined that this radial compression retains the pleats in fixed relation to one another across a range of pressures—in many cases without the need for additional adhesive bonding to the media. But in some higher pressure situations, such as found in many hydraulic systems, an outer layer of adhesive, as will be described below, is necessary or desirable to further retain the pleat peaks in fixed relation to each other.

As shown in FIG. 6, it is preferred that the outer support sleeve 14 has a strand angle $\alpha$ of no more than 90 degrees, and more preferably a strand angle of between 60 and 90 degrees. As shown in this Figure, the "strand angle" is measured in the x (circumferential) direction. When the strand angle is less than 90 degrees, the component of force in the "x" (circumferential) direction is less, thereby allowing greater stretching of the sleeve circumferentially about the cylindrical media. This strand angle also allows for a larger tolerance range for both the sleeve and the cylindrical pleat structure. While the above strange angle range is preferred, the angle of course may vary (even outside this range) depending upon the particular elasticity desired.

Referring again to FIGS. 2 and 3, the support sleeve 14 and the outer support mesh 24 for the pleated media inter-engage at the location of the pleat peaks, due to their similar mesh-like structures. This provides further support (increased fatigue resistance) for the pleats around the filter media.

Figure 7:
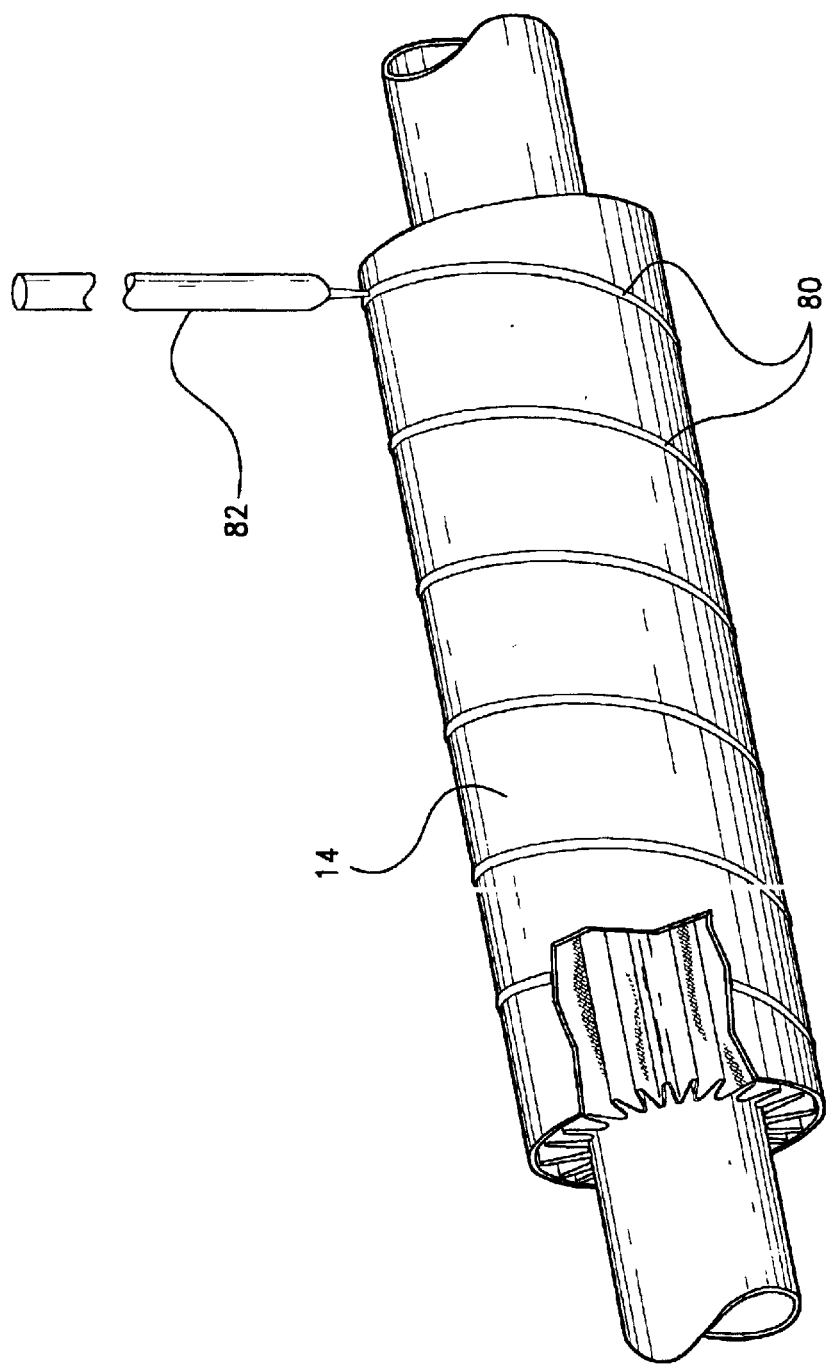
FIG. 7 is a further step in the assembly of the filter elements in either of the embodiments.

After the sleeve is stretched over the media, a bead of adhesive is applied to the outer surface of the sleeve, as illustrated in FIG. 7. The adhesive is preferably applied as a bead 80 in a spiral form around the sleeve 14 using a conventional applicator tool 82. The adhesive is preferably a transparent bonding material which easily wicks through the sleeve, such that the material can form a good bond between the pleat peaks and the sleeve, and does not significantly interfere with the later application of printed information on the outer surface of the cartridge. The adhesive is also preferably UV-cured, which provides good control over the assembly of the sleeve to the media. An appropriate UV-cured adhesive is commercially-available from the Loctite Corporation under the mark/designation 3335 UV cure epoxy adhesive; although it is of course possible that other adhesives might be appropriate or desirable in certain applications, as long as the adhesive has good wicking characteristics, good thermal and chemical resistance, and good bonding properties with the polymeric materials of the sleeve and the media. The elastic sleeve retains the pleat peaks in proper position during the adhesive application and curing, without additional fixturing or mechanical holding of the pleats.

The end caps for the element generally have a circular configuration, with at least one of the ends caps 16 having a central circular opening 30 for fluid flow therethrough. A resilient elastomeric O-ring gasket 32 can be provided in a radially-inward directed groove surrounding opening 30 in end cap 16 for sealing against an appropriate fluid passage in the housing. End cap 17 preferably has a continuous, imperforate structure, or could likewise have a central circular opening to receive a fluid passage in the filter housing. The end caps can be formed of any appropriate impervious material, such as rigid plastic, which is compatible with the fluid to be filtered and which can be easily incinerated or otherwise easily disposed of in a land fill.

The end caps 16, 17 are bonded to the ends of the filter media with an adhesive or by other appropriate means. The adhesive is applied across the entire annular end of the pleated media, and also bonds the support sleeve at the ends of the media, as well as the ends of the support core (if present). While the support sleeve preferably extends the entire length of the pleated media, it is possible that the support sleeve could stop just short of the ends, and still be attached to the media through the mass of adhesive. The end caps 16, 17 can be fixed to the ends of the cartridge either before or after the adhesive is applied as described above.

The pleated filter media can be inwardly supported by a support core, indicated at 33; or can be "coreless", that is, self-supporting, and removeably received around a support tube integral with the filter housing. A support core and support tube generally include a plurality of openings spaced along the length of the tube/core for radial fluid flow, and are closely received within the inner (bight) ends 20 of the pleats to support the inner ends of the pleats. A support tube/core can be formed of any material appropriate for the particular application, such as a rigid plastic (particularly for a support core) or metal (particularly for a support tube). Circumferentially-extending strips of material could also be bonded to the inner ends of the pleats, for example as described in U.S. patent application Ser. No. 08/792,036, filed Jan. 31, 1997 entitled "Coreless Non-Metallic Filter Element", now U.S. Pat. No. 6,099,729, to allow the filter element to be easily inserted into or removed from a support tube in the housing.

Referring now to FIG. 3, to manufacture the filter element 10, the media 12 is initially assembled into a cylindrical configuration. The outer support sleeve 14 is then temporarily attached (e.g., clamped) at its forward end 39 to a conical assembly tool 40. Tool 40 has a first end 42 attached to sleeve 14 of about the same diameter of the sleeve, and a second free end 44 having an inner dimension (inner diameter) which is at least as large as, and preferably slightly larger than, the outer dimension (outer diameter) of the media subassembly. The media 12 is inserted axially into the conical tool 40 through enlarged end 44. As the cylindrical media is inserted through the tool, the media is radially compressed by the conical inner surface of the tool to a dimension smaller than the support sleeve to allow the cylindrical media to be easily slid into the support sleeve 14.

After the media is inserted into sleeve 14, the conical tool 40 is removed from the forward end of the sleeve, with the result that the sleeve extends along the entire length of the cylindrical media.

It is noted that individual media subassemblies can be inserted one at a time into individual support sleeves, or a substantial length of cylindrical media can be inserted in its entirety into a substantially longer outer sleeve, and then the composite structure can be cut to form individual filter elements.

Figure 4:
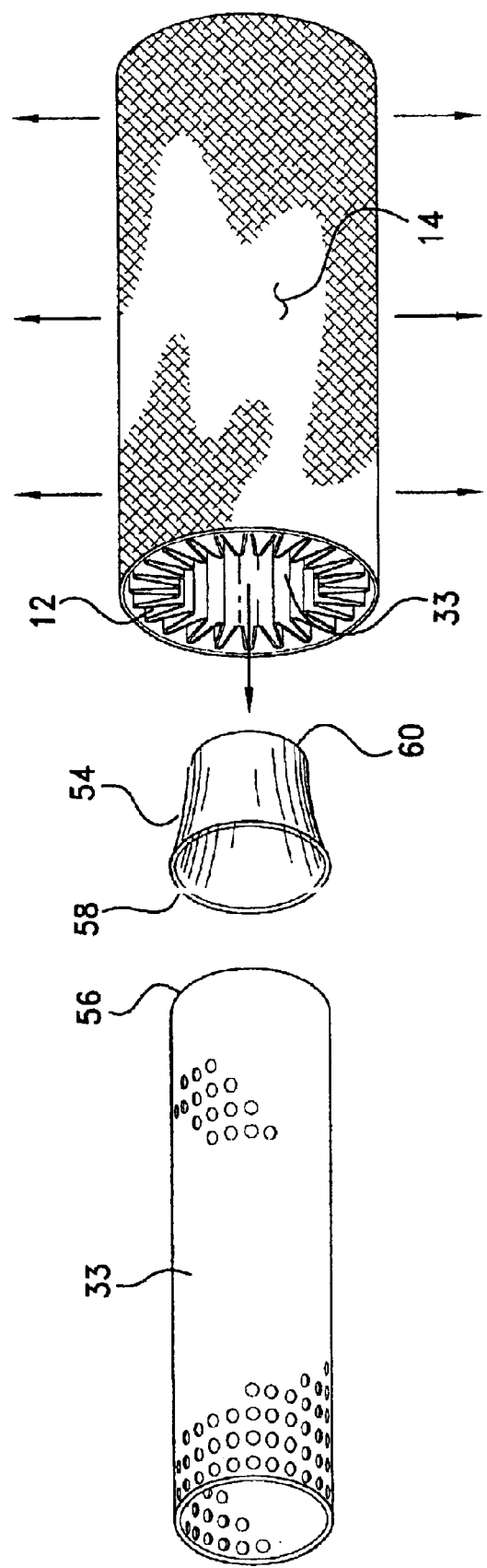
FIG. 4 is a second step in the assembly of the filter element of a first embodiment.

In any case, referring now to FIGS. 4 and 5, the composite structure (media and support sleeve) is then radially enlarged. Referring first to FIG. 4, which illustrates a first embodiment with a central support core 33, the support core has an outer dimension (outer diameter) slightly larger than the normal inner dimension (inner diameter) of the compressed cylindrical media. The support core is provided with a second conical assembly tool 54 temporarily attached (e.g., clamped) to the forward end 56 of the support core. Conical tool 54 has a first end 58 attached to the forward end 56 of the support core with a dimension (outer diameter) about the same size as the outer diameter of the core, and a radially-reduced forward end 60, having a dimension (outer diameter) configured to be received within the central cavity 13 of the cylindrical media.

The support core 33 with conical tool 54 is slid axially into the central cavity 13 of the composite structure, with the conical surface of the tool 54 radially enlarging and expanding the media so that the cylindrical media has an inner dimension (inner diameter) that slides easily over the support core 33. In so doing, the pleats are forced radially outward so as to elastically stretch and deform the surrounding support sleeve 14. Again, it is preferred that the support sleeve be stretched about 3–6% such that the sleeve provides radial compression on the pleat peaks sufficient to retain the pleats in fixed relation to one another. The outer dimension of the support core necessary to accomplish this enlargement can be easily calculated or determined using simple experimentation.

After the support core 33 is inserted into the cylindrical media, the conical tool 54 is removed from the support core. The adhesive is then applied by the tool 82 in a bead around the cartridge as shown in FIG. 7, and is UV-cured. The end caps 16, 17 are then bonded to the ends of the media, thereby also attaching the ends of the support sleeve 14 and inner support core 33 to the media.

Referring now to FIG. 5, which shows a second "coreless" embodiment, a sizing mandrel 70 is provided with an outer dimension (outer diameter) slightly larger than the inner dimension (inner diameter) of the composite media and support sleeve. The mandrel has a conical end 72 that is axially inserted into the central cavity 33 of the cylindrical media. The conical end of the mandrel has a forward end 73 with an outer dimension (outer diameter) configured to be received in the central cavity, and a rear end 74 with an outer dimension (outer diameter) about the same size as the mandrel to allow the mandrel to be easily slid into the cylindrical media. As the mandrel is received in the cylindrical media, the mandrel radially enlarges the composite structure, in the same manner as described above with respect to the embodiment of FIG. 4, such that the pleats expand radially outward into the stretched outer support sleeve, and the sleeve elastically conforms to the pleat peaks to hold the pleat peaks in fixed relation to one another.

The mandrel 70 is then removed, with the result that the composite structure radially contracts, however, this contraction is only slight (i.e., it is still larger than the original outer dimension), and the support sleeve continues to hold the pleats in fixed relation to one another. Again, it is preferred that the resulting support sleeve (after the mandrel is removed) be expanded (stretched) between about 3–6% in order for proper retention of the pleats. The outer dimension of the mandrel necessary to accomplish this enlargement can be easily determined by simple experimentation and/or calculation. The adhesive is then applied in a bead around the cartridge, as in FIG. 7, and the adhesive is UV-cured. The end caps 16, 17 are then bonded to the ends of the media, which again, also attaches the ends of the support sleeve to the media. The coreless element is then suitable to be inserted over a support core integral with a filter housing.

After the end caps are assembled on the ends of the filter element in either of the embodiments above, the element can then be marked with identification indicia (e.g., logos, model numbers, etc.) using an appropriate marking device, such as an ink pad, ink-jet or laser printer. The logos, model numbers, etc. can be applied directly to the outer surface of the support sleeve, which because of its high strand density, and absorption of adhesive, can accept the marking in sufficiently readable form.

As such, the present invention provides a novel and unique fluid filter and a technique for assembling the fluid filter which is relatively easy and straight-forward, and which reduces the overall cost of the element. In addition, the outer support sleeve maintains the pleat peaks in fixed relation to one another without difficult or expensive mechanical or chemical bonding. The components of the filter element also lend themselves to easy disposal in a landfill, as they are easily incineratable. Further, the element can be easily marked such as to facilitate the easy identification of an appropriate filter element for a particular application.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
   a cylindrical pleated filter media having a continuous series of axially-extending interconnected pleats circumscribing a central cavity, the pleats projecting radially-outward from the central axis to define a plurality of pleat peaks,
   a continuous elastic support sleeve, said support sleeve having an inner dimension normally smaller than an original outer dimension of said cylindrical media, and said support sleeve disposed in surrounding, stretched relation around the pleat peaks of the filter media such that the sleeve compressively retains the pleats in fixed relation to one another, and
   a bead of adhesive applied to an outer surface of the support sleeve, said adhesive bead wicking inwardly through the support sleeve and the pleat peaks to the support sleeve.

2. The filter element as in claim 1, wherein the adhesive is a UV-cured adhesive.

3. The filter element as in claim 1, wherein the adhesive and the sleeve are formed of material such that identification indicia can be printed on an outer surface of the sleeve without significant interference by the adhesive.

4. The filter element as in claim 1, wherein the adhesive is applied in a spiral bead around the sleeve.

5. The filter element as in claim 1, further including a perforated inner support core centrally located and supporting the media.

6. A method for assembling a filter element, comprising the steps of:
   providing a cylindrical pleated filter media having a continuous series of axially-extending interconnected pleats circumscribing a central cavity,
   providing a continuous elastic support sleeve, said support sleeve having an inner dimension normally smaller than an original outer dimension of said cylindrical media,
   radially compressing said cylindrical media such that the outer dimension of the cylindrical media is smaller than the inner dimension of the support sleeve, and inserting the compressed cylindrical media into said support sleeve and thereafter expanding said compressed cylindrical media back toward its normal outer dimension such that said support sleeve extends in surrounding relation along the cylindrical media and is elastically stretched to structurally retain the pleats of the cylindrical media in fixed relation to each other,
   applying a bead of adhesive to the outer surface of the sleeve after the sleeve is stretched over the media, and
   bonding a pair of end caps to opposite ends of said cylindrical media.

7. The method as in claim 6, wherein the step of applying the bead or adhesive further comprises applying a UV-cured adhesive.

8. The method as in claim 6, wherein the adhesive and the sleeve are formed of materials such that the adhesive wicks through the sleeve and further including the step of applying identification indicia on an outer surface of the sleeve after the adhesive is applied without significant interference by the adhesive.

9. The filter element as in claim 6, wherein the step of applying the bead of adhesive further comprises applying the bead in a spiral manner around the sleeve.

10. The method as in claim 6, further including the step of inserting a perforated support core with a conical forward surface into the central cavity of the cylindrical media surrounded by said support sleeve, so as to radially enlarge the cylindrical media and elastically deform the support sleeve, said support tube being retained within the central cavity of the cylindrical media.

* * * * *